US012674943B2

(12) United States Patent
Kobayashi et al.

(10) Patent No.: US 12,674,943 B2
(45) Date of Patent: Jul. 7, 2026

(54) MULTI-FIBER OPTICAL CONNECTOR FERRULE AND OPTICAL MODULE

(71) Applicant: HAKUSAN INC., Ishikawa (JP)

(72) Inventors: Moriaki Kobayashi, Ishikawa (JP); Shohei Ueno, Ishikawa (JP)

(73) Assignee: HAKUSAN INC., Ishikawa (JP)

( * ) Notice: Subject to any disclaimer, the term of this patent is extended or adjusted under 35 U.S.C. 154(b) by 204 days.

(21) Appl. No.: 18/566,851

(22) PCT Filed: Jun. 8, 2022

(86) PCT No.: PCT/JP2022/023086
§ 371 (c)(1),
(2) Date: Dec. 4, 2023

(87) PCT Pub. No.: WO2022/260068
PCT Pub. Date: Dec. 15, 2022

(65) Prior Publication Data
US 2024/0272377 A1 Aug. 15, 2024

(30) Foreign Application Priority Data
Jun. 11, 2021 (JP) ................................. 2021-098050

(51) Int. Cl.
*G02B 6/40* (2006.01)
*G02B 6/38* (2006.01)

(52) U.S. Cl.
CPC ............. *G02B 6/40* (2013.01); *G02B 6/3885* (2013.01); *G02B 6/3861* (2013.01)

(58) Field of Classification Search
CPC ........................................................ G03B 6/38
See application file for complete search history.

(56) References Cited

U.S. PATENT DOCUMENTS

| 5,548,677 | A | * | 8/1996 | Kakii | ................... G02B 6/3861 |
| | | | | | 385/83 |
| 2001/0007603 | A1 | * | 7/2001 | Sakurai | ................ G02B 6/3865 |
| | | | | | 385/60 |

(Continued)

FOREIGN PATENT DOCUMENTS

| CN | 210666107 U | 6/2020 |
| JP | 2000-147328 A | 5/2000 |

(Continued)

OTHER PUBLICATIONS

International Search Report (ISR) dated Jul. 12, 2022 filed in PCT/JP2022/023086.

*Primary Examiner* — Jerry Rahll
(74) *Attorney, Agent, or Firm* — RANKIN, HILL & CLARK LLP

(57) ABSTRACT

[Problem] To provide a multi-fiber optical connector ferrule that has low connection loss even when optical wiring is mounted on a substrate.

[Solution] This multi-fiber optical connector ferrule: is obtained by molding a resin composition that includes polyphenylene sulfide; and has optical fiber insertion holes 103 and a guide hole 102 for guide pin insertion. The dimensional variation of the multi-fiber optical connector ferrule when heated at 260° C. is no more than 0.1%. The multi-fiber optical connector ferrule is a high-density optical connector having at least eight optical fiber insertion holes provided therein. The optical fiber insertion holes have an internal diameter of 127 μm and are provided at a pitch of no more than 250 μm.

16 Claims, 6 Drawing Sheets

(56)           References Cited

U.S. PATENT DOCUMENTS

| | | | |
|---|---|---|---|
| 2001/0019646 A1 | 9/2001 | Ueno et al. | |
| 2003/0021548 A1* | 1/2003 | Luther ................. | G02B 6/3885 |
| | | | 385/86 |
| 2008/0008426 A1 | 1/2008 | Nagasaka | |
| 2016/0356962 A1* | 12/2016 | Moriyama ............. | G02B 6/387 |
| 2017/0192181 A1 | 7/2017 | Barwicz et al. | |
| 2018/0120512 A1* | 5/2018 | Nakama ............... | G02B 6/3867 |
| 2022/0220297 A1* | 7/2022 | Otomitsu ................ | C08L 81/06 |

FOREIGN PATENT DOCUMENTS

| | | | | |
|---|---|---|---|---|
| JP | 2002-350680 A | 12/2002 | | |
| JP | 2003-138044 A | 5/2003 | | |
| JP | 2003-185886 A | 7/2003 | | |
| JP | 2004-29415 A | 1/2004 | | |
| JP | 2014-240958 A | 12/2014 | | |
| JP | 2016-139041 A | 8/2016 | | |
| WO | WO-2021024932 A1 * | 2/2021 | .............. | C08L 71/00 |

* cited by examiner

[Fig2]
103    102    100    104    101    105
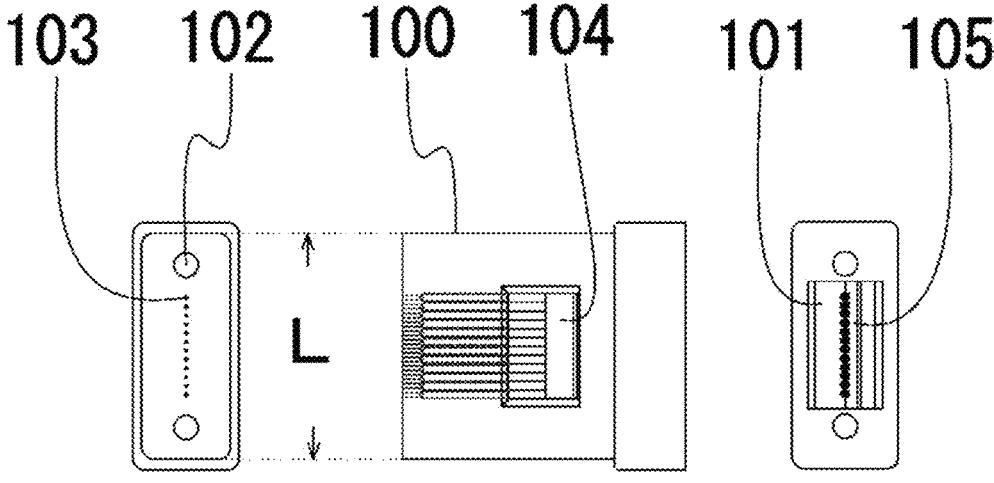

[Fig3]
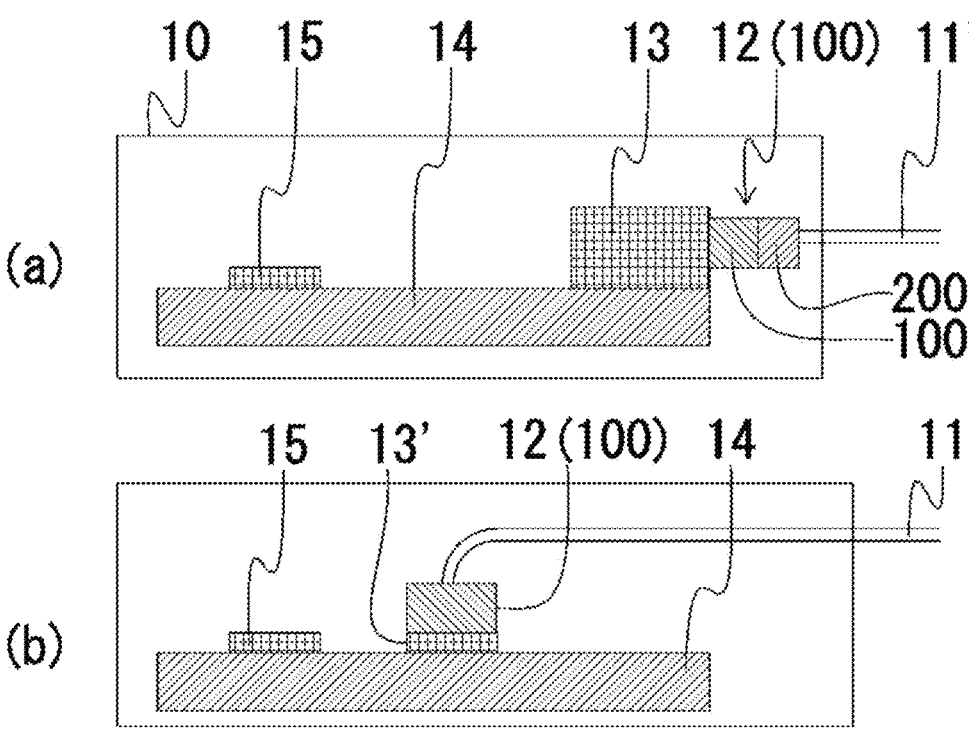

[Fig4]
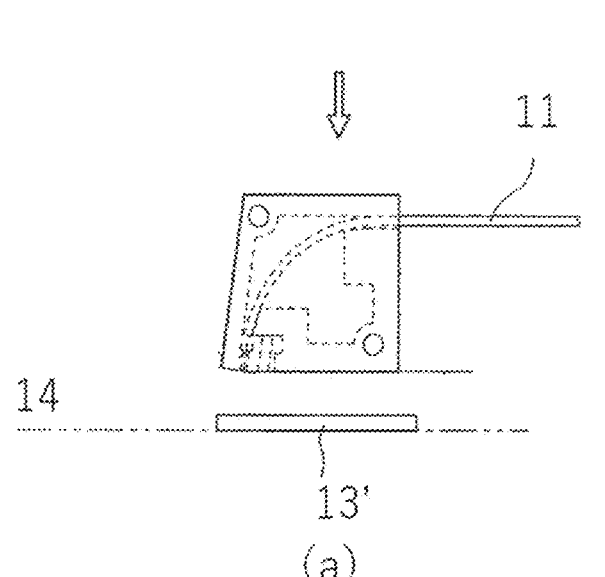
(a)
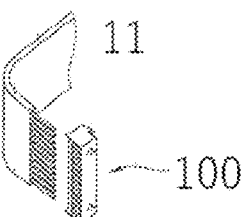
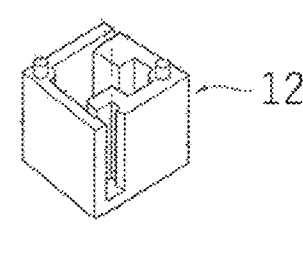
(b)

[Fig5]
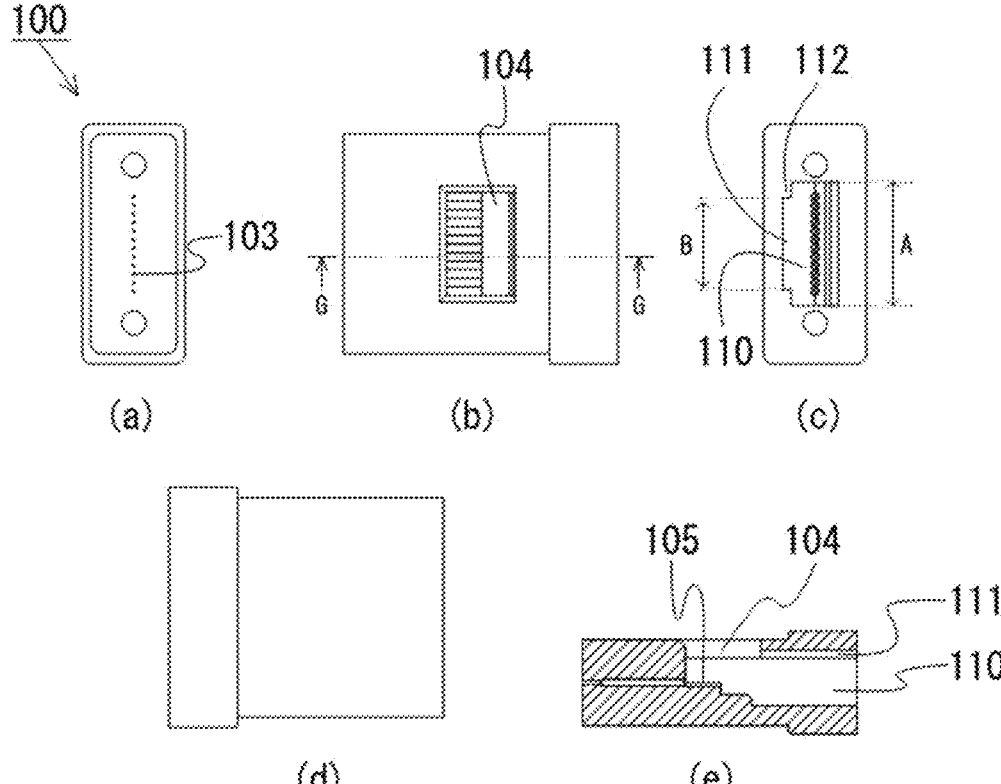
(a)
(b)
(c)
(d)
(e)

[Fig6]
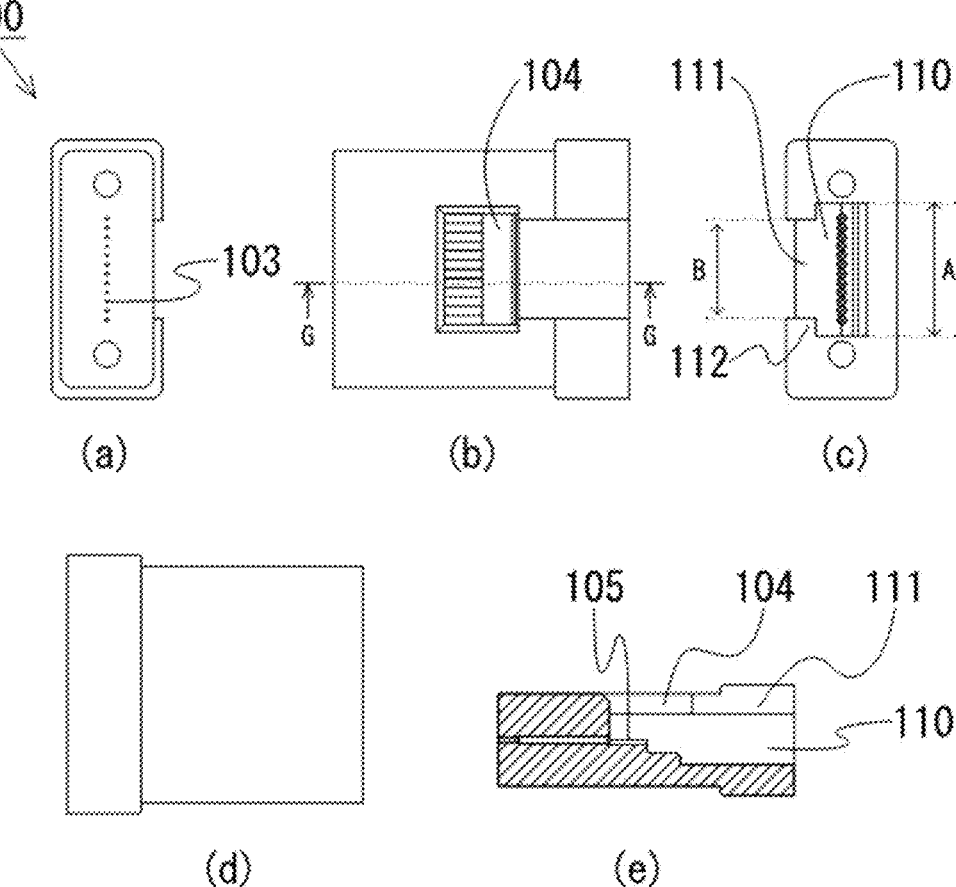
(a)    (b)    (c)
(d)    (e)

MULTI-FIBER OPTICAL CONNECTOR FERRULE AND OPTICAL MODULE

TECHNICAL FIELD

The present invention relates to a multi-fiber optical connector ferrule, and an optical module that includes the ferrule.

BACKGROUND ART

In optical communication, optical connectors are used for mechanically connecting optical fibers.

In particular, MT connectors (Mechanically Transferable connectors) developed for optical network devices are multi-fiber optical connectors that have reliability and have been widely put into practical use mainly for optical communication networks. The MT connector detachably connects a pair of optical connectors using guide pins or clips, and is used for, for example, connection of two to twelve optical fiber tape core wires or optical fiber cords. Not only the MT connector but also a configuration achieved as an MPO connector that stores an optical ferrule in a housing, and includes guide pins, a latch mechanism or the like, is known.

For example, Patent Literature 1 (Japanese Patent Laid-Open No. 2002-350680) discloses an optical ferrule that allows physical contact between optical fibers.

The optical ferrule described in Patent Literature 1 is an injection-molded article made of a resin composition containing 100 parts by mass of polyphenylene sulfide resin, into which 100 to 300 parts by mass of silica having a maximum particle diameter of no more than 100 μm, and 50 to 300 parts by mass of barium titanate are mixed.

Patent Literature 2 (Japanese Patent Laid-Open No. 2001-174666) discloses an optical ferrule that allows physical contact between optical fibers.

The optical ferrule described in Patent Literature 2 is a molded article of a resin composition that contains, as essential constituents, a base resin, silica, and whiskers. The resin composition has a melt viscosity of 300 to 600 [Pa·sec] when measured at a shear rate of 900 [1/sec] at a temperature of 340° C. by using a capillary having a diameter of 0.1 mm and a depth of 30 mm, as defined by JIS-K-7199. Preferably, the optical ferrule is an injection-molded article made of a resin composition that contains the base resin of linear polyphenylene sulfide resin, and 250 to 300 parts by weight of silica and 10 to 70 parts by weight of whiskers relative to 100 parts by weight of the linear polyphenylene sulfide resin.

Patent Literature 3 (Japanese Patent Laid-Open No. 2004-29415) discloses an optical connector including a ferrule that can maintain the dimensional accuracy and the dimensional stability, and further improves the mechanical strength.

The optical connector described in Patent Literature 3 is an optical connector that has optical fiber holes and guide holes, and allows guide pins to be inserted into the guide holes to position connection of optical fibers, and includes a ferrule made of a resin composition containing 10 to 20 wt % of polyphenylene sulfide resin, and 80 to 90 wt % of silica particles.

Patent Literature 4 (Japanese Patent Laid-Open No. 2003-185886) discloses an optical connector that is made of a PPS resin composition containing inorganic filler made up of silica particles, includes an optical connector ferrule fabricated by injection molding, substantially prevents silica from dropping even when the optical connector is attached and detached, and prevents any scar affecting the property of the optical connector from being formed on end faces of optical fibers.

The optical connector described in Patent Literature 4 includes the optical connector ferrule that has at least one optical fiber insertion hole, and two fitting holes for allowing fitting pins for connecting optical connectors to be inserted. The optical connector ferrule is formed of a PPS resin composition that contains fibrous filler and silica particles surface-treated with a vinyl-based silane coupling agent.

Patent Literature 5 (Japanese Patent Laid-Open No. 2003-138044) discloses a molded article that is excellent in injection molding property without loss of melt fluidity of the resin composition, is excellent in mechanical strength of the molded article, and is suitable for an optical connector ferrule or the like having a small connection loss even after being repetitively attached and detached.

The molded article described in Patent Literature 5 is made by melt-molding a PPS resin composition and irradiating the molded article with ionizing radiation, the PPS resin composition containing (A) a PPS resin where specific functions X are introduced to ends of molecules or side chains, and (B) a fused mixture containing, in the same molecule, a carbon-carbon double bond, a function X introduced to the PPS resin, and a group of atoms capable of forming a chemical bond when being fused and mixed, and further containing (C) inorganic filler surface-treated with a silane coupling agent having a carbon-carbon double bond, or a silane coupling agent having a carbon-carbon double bond and inorganic filler.

Patent Literature 6 (Japanese Patent Laid-Open No. 2014-240958) discloses an optical module that allows surface mounting by a reflow furnace, and emits laser light without optical fibers being extended to the outside of a mounting substrate.

The optical module described in Patent Literature 6 includes: a plurality of photonic elements that emit colors, or red, green, and blue, of laser beams; a plurality of optical fibers that guide the color laser beams from the respective photonic elements; a mounting substrate that includes an upper surface mounted with the plurality of photonic elements, and a through electrode formed from the upper surface to the bottom surface for supplying electric signals to the plurality of photonic elements; and a multiplexer that is disposed at a corner of the mounting substrate, and bundles and fixes emission ends of the optical fibers, thus emitting multiplexed light where the color laser beams are multiplexed.

CITATION LIST

Patent Literature

Patent Literature 1: Japanese Patent Laid-Open No. 2002-350680

Patent Literature 2: Japanese Patent Laid-Open No. 2001-174666

Patent Literature 3: Japanese Patent Laid-Open No. 2004-29415

Patent Literature 4: Japanese Patent Laid-Open No. 2003-185886

Patent Literature 5: Japanese Patent Laid-Open No. 2003-138044

Patent Literature 6: Japanese Patent Laid-Open No. 2014-240958

SUMMARY OF INVENTION

Technical Problem

A ferrule is a main component included in a multi-fiber optical connector, and is formed by molding a synthetic resin with a mold.

The ferrule is provided with insertion holes allowing optical fiber tape to be inserted therein, and is provided with a plurality of optical fiber holes allowing optical fibers from which coating has been removed, the optical fiber holes communicating with the respective optical fiber tape insertion holes. Furthermore, guide holes for positioning and connecting optical connectors to each other are provided in parallel with the optical fiber holes in a penetrating manner. The optical fiber tape, with coating at a distal end portion being removed, is inserted from the rear of the ferrule, and a plurality of exposed optical fibers are inserted into the respective optical fiber holes in the ferrule and are fixed with an adhesive. After the optical fibers are inserted into the ferrule, connection end faces of the optical fibers are polished together with a contact face of the ferrule.

Guide pins are preliminarily inserted into the respective guide holes of one ferrule included in the multi-fiber optical connector, and fixed therein, the guide pins are inserted into the respective guide holes of the other ferrule, and the contact faces of the optical connectors are brought into contact with each other, thus achieving collective connection of the optical fibers.

Such ferrules of the optical connectors are required to highly accurately position the axes of the optical fibers to each other. For achieving the positioning, the ferrules require properties, such as the dimensional stability and mechanical strength.

Conventionally, it has been known that polyphenylene sulfide, which has a small shrinkage ratio during molding, is excellent in dimensional stability over time, and is excellent in high fluidity and environment resistance during molding, is used as a ferrule molding material.

Polyphenylene sulfide (PPS) has a low melt viscosity, and allows a large amount of filler to be mixed. Accordingly, ferrules that have a small mold shrinkage ratio, and a high dimensional accuracy can be achieved.

The diameters and pitches of guide holes and fiber insertion holes of the ferrules require a sub-micrometer order of accuracy. For example, it is known that an axial deviation of 1 μm of each fiber insertion hole causes about 0.2 dB of connection loss. Accordingly, molding is required to be performed in consideration that the ferrule is cured and shrunk after molding. However, since the cure shrinkage of the molding material largely varies, it is difficult to form the ferrule at high dimensional accuracy.

Furthermore, when the temperature is changed after the ferrule is formed, the ferrule is expanded or shrunk, which causes dimensional deformation. As a result, there is a problem that the positions of the optical fibers fixed to the ferrule are changed, and a favorable connection loss cannot be achieved.

Accordingly, as described in Patent Literatures 1 to 5, ferrules excellent in dimensional accuracy and dimensional stability have been developed.

On the other hand, as described in Patent Literature 6, in recent years, an optical module where photonic element are mounted on a substrate, and the photonic elements and optical fibers are optically connected to each other has been developed. Thus, an optical mounting circuit where high-speed and high-density optical communication is directly introduced on an electronic board (or in the vicinity of the electronic board), and no electric wiring intervenes has been discussed.

However, with the optical module that connects the photoelectric conversion element mounted on the substrate to the ferrule to which optical fibers are connected, the optical connector provided with the ferrule made of a resin is mounted on the substrate, which is then subjected to solder reflow in some cases. In such cases, there is a problem that heating in the solder reflow process varies the dimension of the ferrule. As a result, the optical fibers are misaligned, which degrades the connection loss.

The temperatures of some components among the electronic components on the substrate become high due to operation. The optical connector mounted on the substrate is sometimes subjected to temperature change having not conventionally occurred. This change sometimes causes misalignment, thus degrading the connection loss.

In particular, the optical mounting circuit requires a ferrule that does not misalign optical fibers even when a high-density optical connector is mounted accompanied by increase in speed and capacity, and has low connection loss.

The present invention has been made to solve the drawbacks described above, and has an object to provide a multi-fiber optical connector ferrule having low connection loss even when optical wiring is implemented on the substrate, and an optical module that includes the ferrule.

The present invention has another object to provide a multi-fiber optical connector ferrule having a property, such as connection loss, unchanged before and after the solder reflow process, and an optical module that includes the ferrule.

The present invention has another object to provide a multi-fiber optical connector ferrule that can maintain the dimensional accuracy and the dimensional stability, and further improve the mechanical strength, and an optical module that includes the ferrule.

The present invention has still another object to provide a multi-fiber optical connector ferrule that can facilitate reduction in weight, and reduce the transmission loss of optical communication even when being used in a wide temperature range, and an optical module that includes the ferrule.

Solution to Problem (1)

A multi-fiber optical connector ferrule according to one aspect is a molded article made of a resin composition containing polyphenylene sulfide, the ferrule including: optical fiber insertion holes; and guide holes for guide pin insertion, wherein a dimensional variation ratio of the multi-fiber optical connector ferrule in case heated at 260° C. is no more than 0.1%.

Note that the dimensional variation ratio of the present invention can be obtained from a product dimension L1 after molding, and a product dimension L2 after a heating test, as indicated by the following Expression 1. (FIG. 2 shows L of single row arrangement.) The value of the dimensional variation ratio is an absolute number.

$$\text{Dimension variation ratio} = \frac{L2 - L1}{L1} \times 100 \qquad \text{[Expression 1]}$$

Accordingly, in a case where the optical connector is mounted on the substrate and subjected to solder reflow, the ferrule hardly varies in dimension even if the ferrule is subjected to a high temperature due to the temperature of the solder reflow process. As a result, the optical fibers are prevented from being misaligned, which can prevent adverse effects, such as of connection loss. Consequently, the property, such as connection loss, is unchanged before and after the solder reflow process. Furthermore, even when the electronic components on the substrate are subjected to temperature change due to operation, the property, such as connection loss, is unchanged.

Consequently, even in a case where the optical wiring is implemented on the substrate, the multi-fiber optical connector ferrule having low connection loss can be achieved.

Note that in this Description, the multi-fiber optical connector ferrule is sometimes simply called a ferrule.

(2)

The multi-fiber optical connector ferrule according to a second invention is the ferrule according to the one aspect, and may further include a boot insertion hole allowing a boot to be inserted from a rear end face side opposite to a connection end face of the ferrule, wherein the boot insertion hole may include a thermal expansion absorbing portion that absorbs thermal expansion of an internal member of the ferrule.

The ferrule according to the present invention has characteristics of hardly causing dimensional variation even when being subjected to a high temperature. Meanwhile, the internal member combined with the ferrule includes optical fibers, the boot for the ferrule through which the plurality of optical fibers are inserted, and an adhesive for fixing these elements.

Among them, the adhesive has a large thermal expansion coefficient, and the inside of the ferrule is filled with the adhesive. Accordingly, in a case where an existing adhesive is used, thermal expansion of the adhesive applies a load on the ferrule, and the ferrule may sometimes be broken.

By providing the thermal expansion absorbing portion in the boot insertion hole, the thermal expansion of the internal member can be spatially absorbed, and unnecessary stress can be alleviated, which can prevent the ferrule from being deformed or broken.

(3)

The multi-fiber optical connector ferrule according to a third invention is the multi-fiber optical connector ferrule according to the one aspect or the second invention, wherein the thermal expansion absorbing portion may have a width-direction length at least 0.5 times and no more than 0.9 times a width-direction length of the boot insertion hole.

Accordingly, the boot can be securely held, and the thermal expansion of the internal member can be sufficiently absorbed.

(4)

The multi-fiber optical connector ferrule according to a fourth invention is the ferrule according to any of the one aspect to the third invention, wherein the multi-fiber optical connector ferrule is a high-density optical connector having at least eight of the optical fiber insertion holes provided therein, and the optical fiber insertion holes may have an internal diameter of no more than 127 μm, and may be provided at a pitch of no more than 250 μm.

The optical connector where the optical fibers have a small diameter, and are packed at a high density causes a failure even in a case where the positional relationship of all the optical fibers deviates only slightly from what is designed.

Use of the ferrule according to the fourth invention can directly introduce high-density optical communication with a high speed and large capacity on the substrate (or in a vicinity of the substrate), and achieve an optical mounting circuit without intervention of electric wiring. Note that the values of the internal diameter and the pitch are nominal values, and may have tolerance.

(5)

The multi-fiber optical connector ferrule according to a fifth invention is the multi-fiber optical connector ferrule according to any of the one aspect to the fourth invention, wherein the ferrule may be connected to a photoelectric conversion element provided on a substrate.

Accordingly, the photoelectric conversion element on the circuit board, and the optical fibers can be directly connected to each other, which can achieve optical implementation at a position closer to the electronic component (CPU or the like) on the circuit board. The multi-fiber optical connector ferrule has the dimensional stability, and has a low connection loss even when being subjected to thermal variation. Accordingly, high-density optical lines can be implemented even at a position close to the electronic component, thus allowing information processing with a high speed and a large capacity.

(6)

An optical module according to a sixth invention is an optical module that includes: a multi-fiber optical connector that includes a multi-fiber optical connector ferrule; and a substrate on which the multi-fiber optical connector is mounted by solder reflow, wherein the ferrule is a molded article that is made of a resin composition containing polyphenylene sulfide, and has optical fiber insertion holes, and guide holes for guide pin insertion, and a dimensional variation ratio of the ferrule in case heated at 260° C. is no more than 0.1%.

Accordingly, even in a case where, during manufacturing the optical module by mounting the optical connector on the substrate by solder reflow, the ferrule is subjected to a high temperature due to the temperature of the solder reflow process, the ferrule hardly varies in dimension. As a result, the optical fibers are prevented from being misaligned, which can prevent adverse effects, such as of connection loss. Consequently, the property, such as connection loss, is unchanged before and after the solder reflow process. Furthermore, even when the electronic components on the substrate are subjected to temperature change due to operation, the property, such as connection loss, is unchanged.

Consequently, even in a case where the optical wiring is implemented on the substrate, the multi-fiber optical connector ferrule having low connection loss can be achieved.

(7)

An optical module according to a seventh invention is an optical module that comprises: a multi-fiber optical connector that includes a multi-fiber optical connector ferrule; and a substrate on which the multi-fiber optical connector is mounted by solder reflow, wherein the ferrule has optical fiber insertion holes and guide holes for guide pin insertion, the ferrule is made by heat-treating a molded article made of a resin composition containing polyphenylene sulfide at a temperature T3, and the temperature T3 at which the heat-treating is performed is below a glass transition temperature T1 of the polyphenylene sulfide, and above a temperature T2 for the solder reflow.

Thus, the ferrule obtained by the heat treatment is the ferrule having been subjected to an annealing process at a predetermined temperature. Accordingly, occurrence of deformation due to thermal shrinkage can be sufficiently suppressed, and the dimensional accuracy of the ferrule can be improved.

(8)

The optical module according to an eighth invention is the optical module according to the seventh invention, wherein the temperature T2 for the solder reflow may be 20° C. to 50° C. below the glass transition temperature T1 of the polyphenylene sulfide, and the temperature T3 at which the molded article is heat-treated may be 5° C. to 20° C. above the temperature T2 for the solder reflow.

As a result, the ferrule obtained by the heat treatment can sufficiently suppress occurrence of deformation due to thermal shrinkage, and the dimensional accuracy of the ferrule can be improved.

If the molded article heat treatment temperature T3 is too low, and out of temperature range of the 5° C. to 20° C. above temperature T2 for the solder reflow, the heat treatment may not be sufficient, and the dimensional variation of the ferrule may increase. Conversely, if the temperature is too high, the ferrule may be deformed, or the mechanical strength of the ferrule may decrease.

(9)

The optical module according to a ninth invention is the optical module according to the eighth invention, wherein the glass transition temperature T1 of the polyphenylene sulfide may be between 290° C. and 310° C., the temperature T2 for the solder reflow may be between 250° C. and 270° C., and the temperature T3 of the heat treatment may be between 265° C. and 290° C.

Thus, the ferrule obtained by the heat treatment can further sufficiently suppress occurrence of deformation due to thermal shrinkage, and the dimensional accuracy of the ferrule can be improved.

(10)

The optical module according to a tenth invention is the optical module according to any of the seventh to ninth inventions, wherein the ferrule heated at the temperature T2 for the solder reflow may have a dimensional variation ratio no more than 0.1% in case heated at 260° C.

As a result, the ferrule obtained by the heat treatment can sufficiently suppress occurrence of deformation due to thermal shrinkage, and the dimensional accuracy of the ferrule can be improved.

(11)

The optical module according to an eleventh invention is the optical module according to the seventh, and may further include a boot insertion hole allowing a boot to be inserted from a rear end face side opposite to a connection end face of the ferrule, wherein the boot insertion hole may include a thermal expansion absorbing portion that absorbs thermal expansion of an internal member of the ferrule.

The ferrule according to the present invention has characteristics of hardly causing dimensional variation even when being subjected to a high temperature. Meanwhile, the internal member combined with the ferrule includes optical fibers, the boot for the ferrule through which the plurality of optical fibers are inserted, and an adhesive for fixing these elements.

Among them, the adhesive has a large thermal expansion coefficient, and the inside of the ferrule is filled with the adhesive. Accordingly, in a case where an existing adhesive is used, thermal expansion of the adhesive applies a load on the ferrule, and the ferrule may sometimes be broken.

By providing the thermal expansion absorbing portion in the boot insertion hole, the thermal expansion of the internal member can be spatially absorbed, and unnecessary stress can be alleviated, which can prevent the ferrule from being deformed or broken.

BRIEF DESCRIPTION OF DRAWINGS

FIG. 1 is a schematic diagram showing an example of a ferrule according to this embodiment.

FIG. 2 is a schematic diagram for illustrating the ferrule according to this embodiment.

FIG. 3 is a schematic diagram of an optical module mounted on a substrate.

FIG. 4 is a schematic diagram of an optical module mounted close to an electronic component on a substrate.

FIG. 5 is a schematic diagram showing an example of a ferrule according to Embodiment 3.

FIG. 6 is a schematic diagram showing an example of a ferrule according to Embodiment 4.

DESCRIPTION OF EMBODIMENTS

Hereinafter, referring to the drawings, embodiments of the present invention are described. In the following description, the same components are assigned the same symbols. The names and functions of them are the same. Accordingly, detailed description of them are not repeated.

Embodiment 1

Figure 1:
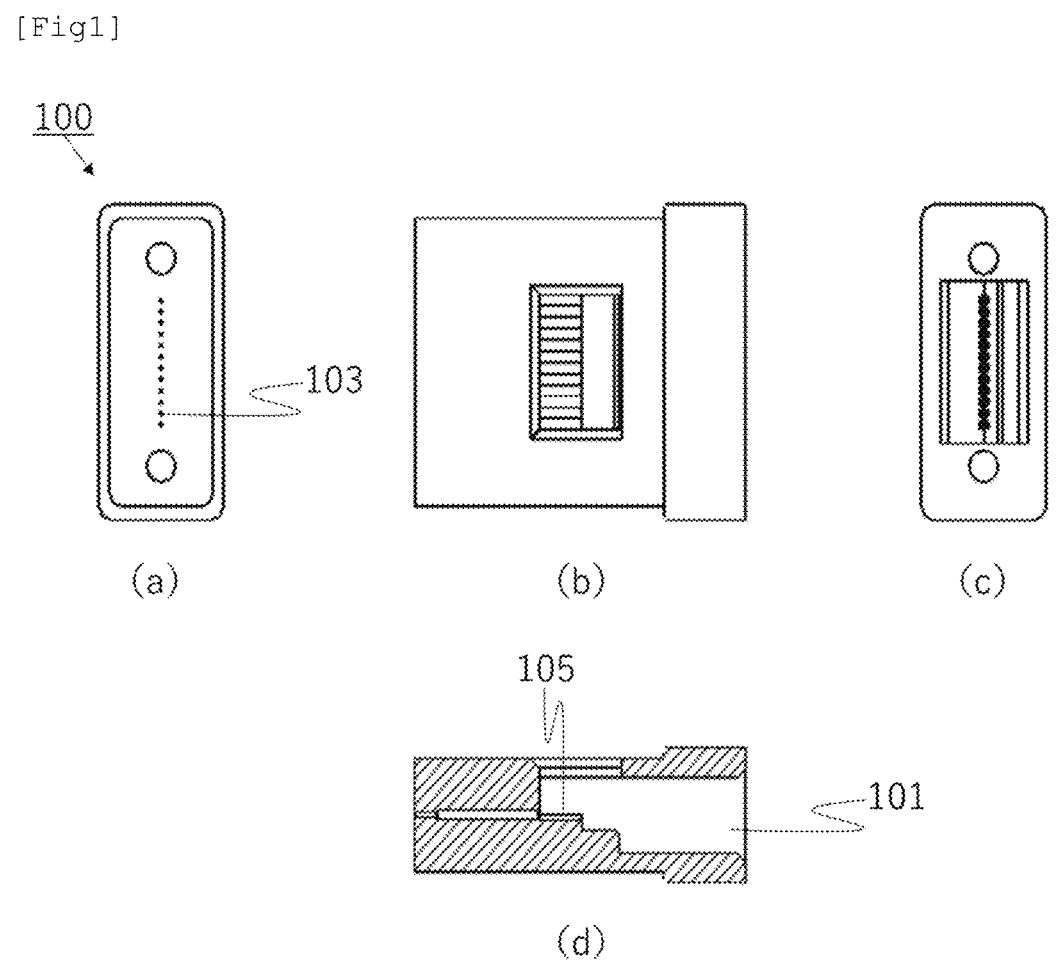

FIGS. 1(*a*), 1(*b*), 1(*c*), and 1(*d*) are a left side view, a front view, a right side view, and a sectional view of a ferrule 100 of this embodiment, respectively. FIG. 2 is a schematic diagram for illustrating the ferrule 100 according to this embodiment.

The ferrule 100 is a main component that constitutes a multi-fiber optical connector, and can be formed by injection molding a resin composition containing PPS with a mold.

The ferrule 100 is a molded article that has insertion holes 103 for optical fibers 11, and guide holes 102 for allowing guide pins to be inserted, and is made of a resin composition containing polyphenylene sulfide.

According to the present invention, the dimensional variation ratio in case the ferrule 100 is heated at 260° C. is no more than 0.1%.

Note that the dimensional variation ratio of the present invention can be obtained from a product dimension L1 after molding, and a product dimension L2 after a heating test, as indicated by the following Expression 1. (FIG. 2 shows L of single row arrangement.) The value of the dimensional variation ratio is an absolute number.

$$\text{Dimension variation ratio} = \frac{L2 - L1}{L1} \times 100 \qquad \text{[Expression 1]}$$

By configuring the dimensional variation ratio in case the ferrule 100 is heated at 260° C. to be no more than 0.1%, the dimensional variation of the ferrule 100 hardly occurs even in a case where the ferrule 100 is subjected to a high temperature due to the temperature of the solder reflow process (typically, about 260° C.) during mounting of an optical connector 12 on a substrate 14 by solder reflow. If the dimensional variation exceeds 0.1%, the dimensional variation of the ferrule 100 is large. Accordingly, the optical fibers 11 inserted and fixed in the respective fiber holes of the ferrule 100 are misaligned, and the connection loss is prone to be large.

As shown in FIG. 1, the ferrule 100 in this embodiment is provided with an optical fiber tape receptacle port 101 into which the optical fiber tape is to be inserted. The plurality of fiber insertion holes 103 that allow the respective optical fibers 11 with the coating being removed to be inserted therein are provided so as to communicate with the optical fiber tape receptacle port 101. Furthermore, the ferrule 100 is provided with guide holes 102 for positioning and connecting the optical connector 12, in parallel with the optical fiber insertion holes 103 in a manner through this ferrule 100.

The ferrule 100 in this embodiment is provided with an opening 104 as an adhesive filling hole for allowing an adhesive to be filled therein. The coating at a distal end portion of the optical fiber tape is removed, and the optical fiber tape is inserted into the fiber tape receptacle port 101 from the rear side of the ferrule 100, and the plurality of exposed optical fibers 11 are inserted into the respective optical fiber insertion holes 103 and are fixed with the adhesive filled in the opening 104. After the optical fibers 11 are inserted into the ferrule 100, connection end faces of the optical fibers 11 are polished together with a contact face of the ferrule 100.

The optical fibers 11 are drawn with drawn portions at the back of the ferrule being protected by a boot formed of an elastic material, such as rubber or synthetic resin. The boot is fixed in a boot insertion hole 110 on the back of the ferrule 100 with the adhesive.

The optical fiber tape attached to the ferrule 100 may be optical fiber tape core wires that include optical fiber bare wires covered with coating, and common coating integrating the covered wires, or optical fiber ribbon cords that include optical fiber tape core wires, and protective coating applied on the core wires.

Guide pins are preliminarily inserted into the respective guide holes 102 of one ferrule 100 included in the multi-fiber optical connector, and fixed therein, the guide pins are inserted into the respective guide holes of the other ferrule 100, and the contact faces of the optical connectors 12 are brought into contact with each other, thus achieving connection of the optical fibers 11.

The optical connector 12 having such a configuration positions the axes of the optical fibers 11 with the guide pins, and abuts the contact faces using coupling clips or the like, thus achieving optical connection. The optical fibers 11 may be, for example, single-mode or multimode optical fibers. Those having a nominal cladding diameter of 125 or 80 μm may be adopted. The number of optical fiber insertion holes 103 may by, for example, 8, 12, 24, 32, or 60. In the case of a large number, the holes may have a multi-row configuration.

Note that the ferrule 100 may have a shape of an MT connector (JIS C5981) in conformity with a positioning pin coupling scheme, and be configured to allow the optical fibers 11 to be connected in a multi-stage manner. The ferrule 100 in this embodiment conforms to an existing standard of a pin coupling scheme. Accordingly, optical implementation on the substrate 14 can be achieved by utilizing conventional connection components.

As described above, the optical fibers 11 are used as tape core wires that include multiple wires collectively configured as tape. The outer coating layer of the tape core wires is removed only over a predetermined end length, where the optical fibers 11 are exposed, inserted into the ferrule 100, and supported at a prescribed pitch for connection. The ferrule 100 may have a substantially rectangular parallelepiped shape with a stepped portion on the outside. On one end face side, the fiber tape receptacle port 101 for accepting the tape core wires in the ferrule 100 is provided, and a supporter 105 that supports the optical fibers 11 is provided.

The opening 104 is formed in the upper end face of the ferrule 100 so as to allow the internal space to communicate with the outside, and is open upward in the perpendicular direction in the surface for filling with an adhesive and has a rectangular shape allowing the inside to be viewed, as shown in FIG. 2. The opening 104 is used to allow insertion of the optical fibers 11 into the supporter 105 to be visually identified, and is also used as a filling opening through which the adhesive is injected for fixation after the insertion. The shape of the filling opening (opening) 104 may be any shape only if the optical fiber insertion holes 103 can be viewed. The optical fiber insertion holes 103 are through-holes from an insertion face to the contact face of the supporter 105. The adjacent holes are formed in parallel with each other.

FIG. 3 is a schematic diagram of the optical module mounted on the substrate 14. The ferrule 100 in this embodiment is fixed directly on or adjacent to the substrate 14, and connection is achieved through a photoelectric conversion element 13 and the optical fibers 11. A component to which the ferrule 100 in this embodiment is connected is not specifically limited. For example, the ferrule 100 is connected to an existing MT ferrule 200, and the optical fibers 11' extending from the MT ferrule 200 are wired on a housing 10 side.

The ferrule 100 in this embodiment can be connected as the optical connector 12 using a typical MPO housing. In the housing, pressing springs may be embedded in order to mechanically connect the optical fibers 11. The end face of the connector may be polished at 8° to reduce the return loss.

For optical implementation of an electronic circuit on the substrate 14, an optical transceiver including the photoelectric conversion element 13 is provided at the end of the substrate 14, thus allowing connection to the optical connector 12 (FIG. 3(a)).

An example of the optical transceiver may be one that stores light receiving elements and light emitting elements, together with lenses in a device holder, as the photoelectric conversion element 13. As for the device holder type optical transceiver, leads (or their FPC) of the photoelectric conversion element 13 are soldered on the substrate 14, and the optical transceiver is connected to the ferrule 100 attached to the receptacle fixed on the substrate 14.

The ferrule 100 in this embodiment is formed by molding a resin composition that mainly contains polyphenylene sulfide (hereinafter, also called PPS). The resin composition may contain inorganic filler in addition to PPS. As the inorganic filler, silica particles and fibrous filler can be contained.

(PPS)

PPS used in the present invention may be any of a crosslinked type, semi-crosslinked type, and linear type, or a mixture of them.

The PPS may be a PPS of a grade used for injection molding. Preferably, the PPS has a linear type molecular structure in view of melt fluidity, tensile strength, breaking bending strain and the like. However, for the sake of improving various properties, a branching structure can be introduced.

In terms of securing the fusing property of the resin composition containing inorganic filler, it is preferable that the molecular weight of the PPS should be 10 to 100 Pa·s, in case represented as a melt viscosity at 300° C. and a shear rate of 500 sec$^{-1}$, and it is more preferable that the molecular weight should range from 15 to 80 Pa·s. With the PPS having the melt viscosity in this range, the melt fluidity is secured, a molded article has a favorable dimensional accuracy, and an excellent mechanical strength.

The fibrous filler may be, for example, glass fibers, carbon fibers, tungsten core wires, boron fibers or silicon carbide fibers that are carbon fibers deposited with boron or silicon carbide, aromatic polyamide fibers, or various types of fibrous fillers. Such fibrous filler may be solely used, or various types may be used in combination.

Among the fibrous fillers described above, glass fibers or carbon fibers are specifically preferable. Use of glass fibers and carbon fibers can make a molded article excellent in mechanical strengths, such as tensile strength, bending strength, and bending elastic modulus, and facilitate reduction in linear expansion coefficient.

Carbon fibers can be used irrespective of the type of material, such as rayon-based, polyacrylonitrile-based (PAN-based), lignin-poval-based mixture, special-pitch-based or the like. The carbon fiber may have a shape of any of long and short monofilaments.

To improve the adhesion between the fibrous filler and PPS as the base resin, and improve the mechanical property of the ferrule 100, the surface of the fibrous filler may be subjected to a surface treatment using a treatment agent containing an epoxy-based resin, a polyamide-based resin, a polycarbonate-based resin, or a polyacetal-based resin, and/or a silane-based coupling agent or the like.

In a case where the resin composition contains silica particles and fibrous filler, it is preferable that the resin composition should be a mixture that contains 20 to 40 wt % of PPS resin, and 60 to 80 wt % of inorganic filler.

(Silica Particles)

In a case of only using a fibrous material as the filler, the molded article is prone to be aeolotropic, and a failure that the mold shrinkage ratio varies depending on sites of the ferrule 100 sometimes occurs. Preferably, the ferrule 100 according to the present invention adopts both fibrous filler, and silica particles excellent in isotropy.

The silica particles may be of fused silica, crystalline silica, or a mixture of them. The shapes of silica particles may be spherical or fractured ones, or a mixture of them. The silica particles are classified into spherical and irregular shapes in terms of shape. The present invention may use any of them, or a mixture of them. However, it is preferable to use spherical silica.

Preferably, the silica particles contained in the resin composition of the present invention should have an average particle diameter in a range from 0.1 to 1.0 μm.

Furthermore, according to the present invention, the silica particles can be silane-treated and contained. By silane-treating the silica particles, the adhesion with PPS is improved, which can improve the mechanical strength after the ferrule 100 is formed.

Any of various types of silane, such as vinylsilane, phenylsilane, aminosilane, methacrylic silane, epoxysilane, and mercapto silane, may be used as the silane coupling agent for this treatment.

The amount of contained silica particles may be 100 to 300 parts by mass relative to 100 parts by mass of polyphenylene sulfide. Preferably, the amount may be 100 to 200 parts by mass relative to 100 parts by mass of polyphenylene sulfide.

To maintain a degree of fluidity allowing favorable injection molding of a resin composition, it is preferable that the content of silica particles should be no more than 70 wt %.

(Other Additives)

Note that typical additives, such as antioxidant, thermo-stabilizer, UV protector, lubricant, colorant, and flame retardant, may be added to the resin composition used in the present invention.

(Method of Manufacturing Ferrule 100)

The materials constituting the resin composition are dry-blended using a Henschel mixer, a ball mixer, a ribbon blender, a Loedige mixer, an ultra-Henschel mixer or the like if required, and are melt-kneaded by a melt extruder, such as a twin-screw kneading extruder, thus allowing pellets for molding to be obtained.

The ferrule 100 can be molded by extruding a melt resin composition into a mold using a molding machine, such as an injection molder, forming it into a shape of an MT ferrule, and cooling and solidifying it.

After molding, by a heat treatment process (annealing process), a deformation and/or a residual stress are removed.

Here, "annealing process" is a process of exposing a material from which a deformation and/or a residual stress are intended to be removed, to a high temperature. The highest temperature in the annealing process is no more than temperatures at which the molded article is not deformed. Although the holding time period is not specifically designated, it is preferable that the time period should be at least 30 minutes, and it is more preferable that the time period should be at least one hour.

The exposure of the resin composition to the annealing temperature causes dimensional variation (contraction). This facilitates crystallization of PPS, improves the mechanical strength, and improves the dimensional stability. In particular, annealing at a temperature higher than the temperature T2 for the solder reflow can reduce the dimensional variation when the ferrule 100 is exposed to the temperature T2 for the solder reflow to the minimum.

Preferably, the glass transition temperature of the ferrule 100 is at least 85° C. This temperature is more preferably at least 100° C., and even more preferably at least 130° C. Note that the upper limit of the glass transition temperature is normally 300° C. Preferably, the upper limit is about 200° C. Since this improves the heat resistance of the ferrule 100, and makes the ferrule 100 resistant to thermal deformation, the optical module can be used even under a high-temperature environment without any trouble.

(Optical Module)

The optical module according to the present invention includes: the optical connector 12 that includes the ferrule 100; and the substrate 14 on which the optical connector 12 is mounted by solder reflow.

More specifically, the optical module includes: the photoelectric conversion elements; the ferrule 100 having optical fiber insertion holes at positions corresponding to the photoelectric conversion elements, and the optical fibers 11 that are inserted into the respective optical fiber insertion holes of the ferrule 100, and optically connected to the photoelectric conversion elements. Optical waveguides may be provided between the photoelectric conversion elements and the optical fibers 11.

As described above, the ferrule 100 includes the insertion holes 103 for the optical fibers 11, and the guide holes 102 for guide pin insertion. The ferrule 100 is obtained by forming a molded article from a resin composition containing polyphenylene sulfide, and heat-treating the molded article at the heat treatment temperature T3.

Preferably, the heat treatment temperature T3 is below the glass transition temperature T1 of the polyphenylene sulfide, and above the temperature T2 for the solder reflow.

In particular, the temperature T2 for the solder reflow can be 20° C. to 50° C. below the glass transition temperature T1 of the polyphenylene sulfide, and the molded article heat treatment temperature T3 can be 5° C. to 20° C. above the temperature T2 for the solder reflow.

The glass transition temperature T1 of the polyphenylene sulfide can be 290 to 310° C., the temperature T2 for the solder reflow can be 240 to 270° C., and the heat treatment temperature T3 can be 250 to 290° C.

If the temperature T2 for the solder reflow is too high, and out of the temperature range of the 20-50° C. below glass transition temperature T1 of the polyphenylene sulfide, the dimensional variation of the ferrule 100 may increase. Conversely, if the temperature is too low, the advantageous effect of improving the dimensional accuracy of the ferrule 100 may be small.

The temperature T3 at which the molded article is heat-treated may be 5 to 20° C. above the temperature T2 for the solder reflow. By increasing the heat treatment temperature, the dimensional variation becomes large. On the other hand, it can also be said that if the temperature becomes close to the melting temperature, the effects due to deformation or the like are prone to be applied. The temperature T3 can be switched depending on the type or usage.

EXAMPLES

Example 1

An Example of the present invention is described.
(1) Resin Composition for Ferrule
DURAFIDE made by Polyplastics Co., Ltd. was prepared as a resin composition for a ferrule.
The resin composition contains linear polyphenylene sulfide resin, silica particles, and fibrous filler.
(2) Ferrule Molding
The resin composition was manufactured by melt-kneading the PPS, silica particles surface-treated with the silane coupling agent, and fibrous filler by the twin-screw extruder, and processing them into pellets.
Using the obtained resin composition, the ferrule 100 having the configuration shown in FIG. 1 was formed by injection molding. It was verified that the ferrule 100 obtained by injection molding was contracted by 0.5%, as a dimensional variation, relative to the mold design.
(3) Heat Treatment
Next, the molded article (MT ferrule) was placed in a constant temperature bath, and was subjected to an annealing process at setting temperatures (270° C., 280° C., 290° C., and 300° C.) higher than the reflow temperature, for three hours.
The dimensional variation of the ferrule 100 after the heat treatment was verified in comparison with that before the heat treatment. The dimensional variation values before and after the heat treatment are shown in Table 1.

TABLE 1

| Annealing temperature | Dimensional variation |
|---|---|
| 270° C. | 0.20% |
| 280° C. | 0.30% |
| 290° C. | 0.40% |

(4) Reflow Simulation Test
The MT ferrule brought back to ordinary temperature after the annealing process was placed in the constant temperature bath, and heated at 260° C. for 20 minutes, thus performing a reflow simulation test. A typical solder reflow process only requires 260° C. and several minutes. However, in this test, to reliably confirm that no thermal variation occurs, the test was performed under a high-temperature environment for 20 minutes. The tested MT ferrule was brought back to ordinary temperature. The dimensions thereof were measured. The variation value due to heating was verified.

As a result, the MT ferrule subjected to the heat treatment had a dimensional variation no more than 0.1% (no more than a measurement limit) at every temperature in Table 1.

Comparison Example

As a comparison example, a reflow simulation test was performed, similar to Example 1, on a MT ferrule not to be subjected to the heat treatment. As a result, it was verified that the dimensional variation was at least 0.2%.

It was thus confirmed that the heat treatment of the MT ferrule made of PPS at 265° C. to 290° C. reliably suppressed the dimensional variation at the simulation test reflow temperature (260° C.).

Embodiment 2

In Embodiment 1, the example of the shape of the MT connector (JIS C5981) was described. For implementation on an electronic board, it is preferable to dispose an optical terminal at a position closer to an electronic component 15. In this case, as shown in FIG. 3(*b*), an optical connector 12 that can be wired perpendicular to the substrate 14 may be adopted.

FIG. 4 is a schematic diagram of the optical module mounted adjacent to the electronic component 15 on the substrate. In this case, the optical connector 12 connects the photoelectric conversion element 13 attached on the substrate 14 to the optical fibers 11, and the optical fibers 11 are wired in parallel with the substrate 14 while maintaining a predetermined radius of curvature. Accordingly, the optical connector 12 can be mounted close to the electronic component 15, such as a CPU.

Embodiment 3

FIGS. 5 (*a*), 5 (*b*), 5 (*c*), 5(*d*), and 5(*e*) are a left side view, a front view, a right side view, a bottom view, and a sectional view taken along line G of a ferrule 100 in Embodiment 3, and show an example of the ferrule 100 that includes, in a boot insertion hole 110, a thermal expansion absorbing portion 111 that absorbs the thermal expansion of an internal member.

The ferrule 100 according to Embodiment 3 is provided with the boot insertion hole 110 in the rear end face side opposite to the connection end face of the ferrule 100. The thermal expansion absorbing portion 111 is provided with the boot insertion hole 110 in the upper surface adjacent to the rear end face so as to form a cutout. Boot holders 112 that hold the boot are formed at both ends of the thermal expansion absorbing portion 111 in the width direction.

Note that in Embodiment 3, the upper surface of the ferrule 100 is formed similarly to that in Embodiment 1. The thermal expansion absorbing portion 111 is formed inside the ferrule 100.

The ferrule 100 according to the present invention hardly causes dimensional variation even when being subjected to a high temperature. Meanwhile, the internal member combined with the ferrule 100 includes optical fibers 11, the boot for the ferrule through which the tape of the plurality of optical fibers is inserted, and an adhesive for fixing the optical fibers.

Among them, the adhesive has a large thermal expansion coefficient, and the inside of the ferrule 100 is filled with the adhesive. Accordingly, in a case where an existing adhesive is used, thermal expansion of the adhesive applies a load on the ferrule 100, and the ferrule 100 may sometimes be broken. By providing the thermal expansion absorbing portion 111 in the boot insertion hole 110, the thermal expansion of the adhesive can be spatially absorbed, and unnecessary stress can be alleviated, which can prevent the ferrule 100 from being deformed or broken. Note that an example of an existing adhesive may be an epoxy resin or the like, which has a linear expansion coefficient typically ranging about from 100 to 250 ppm/° C. An example of an existing boot is formed of a material, such as rubber, or silicone elastomer, which has elasticity and is deformable.

In this case, preferably, the thickness of the thermal expansion absorbing portion 111 in the height direction (vertical direction) is at least 0.1 times the thickness of the boot insertion hole 110 in the height direction, and more preferably, at least 0.5 times. Accordingly, the thermal expansion of the adhesive can be sufficiently absorbed.

Preferably, the width-direction length B of the thermal expansion absorbing portion 111 is at least 0.5 times and no more than 0.9 times the width-direction length A of the boot insertion hole 110, and more preferably, at least 0.6 times and no more than 0.8 times. Accordingly, the boot can be securely held, and the thermal expansion of the internal member can be sufficiently absorbed.

Note that in FIG. 5, the thermal expansion absorbing portion 111 is provided on the upper surface of the ferrule 100. Alternatively, this absorbing portion may be provided on the lower surface of the ferrule 100. The depth direction of the thermal expansion absorbing portion 111 (fiber axial direction) is configured so as to communicate with the opening 104. However, the configuration can be appropriately designed depending on the size of the boot to be inserted. Preferably, the width-direction length B of the thermal expansion absorbing portion 111 is shorter than the width-direction length of the opening 104.

Embodiment 4

FIGS. 6 (*a*), 6 (*b*), 6 (*c*), 6 (*d*), and 6 (*e*) are a left side view, a front view, a right side view, a bottom view, and a sectional view taken along line G of a ferrule 100 in Embodiment 3, and show another example of the ferrule 100 that includes, in a boot insertion hole 110, a thermal expansion absorbing portion 111 that absorbs the thermal expansion of an internal member.

The ferrule 100 according to Embodiment 4 is similar to Embodiment 3 in that the expansion absorbing portion 111 is provided on the upper surface adjacent to the rear end face. However, the expansion absorbing portion 111 in this embodiment is formed to open on the upper surface of the ferrule 100.

Consequently, the boot insertion hole 110 is formed to causes the rear end face and part of the upper surface of the ferrule 100 to communicate with each other, and thus opens. Accordingly, similar to Embodiment 3, the thermal expansion of the internal member can be spatially absorbed, and unnecessary stress can be alleviated, which can prevent the ferrule 100 from being deformed or broken. Furthermore, only a lower communicating opening is required to be provided on the rear end face side of the ferrule 100. Accordingly, the structure is simple, which facilitates fabrication.

Note that the boot holders 112 that hold the boot are formed at both ends of the thermal expansion absorbing portion 111 in the width direction.

In this case, preferably, the thickness of the thermal expansion absorbing portion 111 in the height direction is at least 0.1 times the thickness of the boot insertion hole 110 in the height direction, and more preferably, at least 0.5 times. Accordingly, the thermal expansion of the internal member can be sufficiently absorbed.

Preferably, the width-direction length B of the thermal expansion absorbing portion 111 is at least 0.5 times and no more than 0.9 times the width-direction length A of the boot insertion hole 110, and more preferably, at least 0.6 times and no more than 0.8 times. Accordingly, the boot can be securely held, and the thermal expansion of the internal member can be sufficiently absorbed.

Note that the depth direction of the thermal expansion absorbing portion 111 (fiber axial direction) is configured so as to communicate with the opening 104. However, the configuration can be appropriately designed depending on the size of the boot to be inserted. Preferably, the width-direction length B of the thermal expansion absorbing portion 111 is shorter than the width-direction length of the opening 104.

(Reflow simulation test)

A boot made of silicon was attached to the ferrule shown in Embodiments 1 to 4 (FIGS. 1 and 6), optical fibers made of quartz were inserted thereinto, an epoxy-based thermosetting adhesive was applied and filled through the receptacle port 101, and the adhesive was cured by heating at about 120° C., thus performing assembly.

A reflow simulation test was performed at 260° C. for 10 minutes, and in some samples including the ferrule 100 in FIG. 1, stress internally occurred, which caused a crack. On the other hand, samples using the ferrule 100 in FIG. 6 that included the thermal expansion absorbing portion 111 did not cause a failure, such as a crack, even after the reflow simulation test.

In the present invention, the ferrule 100 corresponds to "ferrule", the insertion holes 103 correspond to "optical fiber insertion holes", the guide holes 102 correspond to "guide holes", the substrate 14 corresponds to "substrate", and the optical connector 12 corresponds to "multi-fiber optical connector".

Although the preferable one embodiment of the present invention is as described above, the present invention is not limited only to this. It should be understood that various embodiments without departing from the spirit and scope of the present invention can be made. Furthermore, in this embodiment, the operation and advantageous effects due to the configuration of the present invention are described. However, these operation and advantageous effects are only examples, and do not limit the present invention.

REFERENCE SIGNS LIST

10 Housing
11 Optical fiber
12 Optical connector
13 Photoelectric conversion element
14 Substrate
15 Electronic component
100 Ferrule
101 Receptacle port

102 Guide hole
103 Optical fiber insertion hole
104 Opening
105 Supporter
110 Boot insertion hole
111 Thermal expansion absorbing portion
112 Boot holder

The invention claimed is:

1. A multicore optical connector ferrule that is a molded article made of a resin composition containing polyphenylene sulfide as a main component of a base resin of the resin composition, the ferrule comprising:
    optical fiber insertion holes; and guide holes for guide pin insertion,
    wherein a dimensional variation ratio of the multicore optical connector ferrule in case heated at 260° C. is no more than 0.1%.

2. The multicore optical connector ferrule according to claim 1, further comprising:
    a boot insertion hole allowing a boot to be inserted from a rear end face side opposite to a connection end face of the ferrule,
    wherein the boot insertion hole includes a thermal expansion absorbing portion that absorbs thermal expansion of an internal member of the ferrule.

3. The multicore optical connector ferrule according to claim 2, wherein the thermal expansion absorbing portion has a width-direction length at least 0.5 times and no more than 0.9 times a width-direction length of the boot insertion hole.

4. The multicore optical connector ferrule according to claim 1,
    wherein the multicore optical connector ferrule is a high-density optical connector having at least eight of the optical fiber insertion holes provided therein, and
    the optical fiber insertion holes have an internal diameter of no more than 127 μm, and are provided at a pitch of no more than 250 μm.

5. The multicore optical connector ferrule according to claim 1, wherein the ferrule is connected to a photoelectric conversion element provided on a substrate.

6. The multicore optical connector ferrule according to claim 1, wherein the resin composition contains the polyphenylene sulfide in an amount of 50 wt % or more of the base resin of the resin composition.

7. The multicore optical connector ferrule according to claim 1, wherein the resin composition contains 20 wt % or more and 40 wt % or less of the polyphenylene sulfide with respect to the resin composition.

8. The multicore optical connector ferrule according to claim 7, wherein the resin composition further contains 60 wt % or more and 80 wt % or less of an inorganic filler with respect to the resin composition.

9. An optical module, comprising: a multicore optical connector that includes a multicore optical connector ferrule; and a substrate on which the multicore optical connector is mounted by solder reflow,
    wherein the ferrule has optical fiber insertion holes and guide holes for guide pin insertion,
    the ferrule is made by heat-treating a molded article made of a resin composition containing polyphenylene sulfide as a main component of a base resin of the resin composition, at a temperature T3, and
    the temperature T3 at which the heat-treating is performed is below a glass transition temperature T1 of the polyphenylene sulfide, and above a temperature T2 for the solder reflow.

10. The optical module according to claim 9, wherein the ferrule heated at the temperature T2 for the solder reflow has a dimensional variation ratio no more than 0.18 in case heated at 260° C.

11. The optical module according to claim 9, further comprising:
    a boot insertion hole allowing a boot to be inserted from a rear end face side opposite to a connection end face of the ferrule,
    wherein the boot insertion hole includes a thermal expansion absorbing portion that absorbs thermal expansion of an internal member of the ferrule.

12. The optical module according to claim 9, wherein the temperature T2 for the solder reflow is 20° C. to 50° C. below the glass transition temperature T1 of the polyphenylene sulfide, and the temperature T3 at which the molded article is heat-treated is 5° C. to 20° C. above the temperature T2 for the solder reflow.

13. The optical module according to claim 12, wherein the glass transition temperature T1 of the polyphenylene sulfide is between 290° C. and 310° C., the temperature T2 for the solder reflow is between 250° C. and 270° C., and the temperature T3 of the heat treatment is between 265° C. and 290° C.

14. The optical module according to claim 9, wherein the resin composition contains the polyphenylene sulfide in an amount of 50 wt % or more of the base resin of the resin composition.

15. An optical module, comprising: a multicore optical connector that includes a multicore optical connector ferrule; and a substrate on which the multicore optical connector is mounted by solder reflow,
    wherein the ferrule is a molded article that is made of a resin composition containing polyphenylene sulfide as a main component of a base resin of the resin composition, and has optical fiber insertion holes, and guide holes for guide pin insertion, and
    a dimensional variation ratio of the ferrule in case heated at 260° C. is no more than 0.1%.

16. The optical module according to claim 15, wherein the resin composition contains the polyphenylene sulfide in an amount of 50 wt % or more of the base resin of the resin composition.

\* \* \* \* \*